United States Patent [19]

Kaiser et al.

[11] Patent Number: 5,784,710
[45] Date of Patent: Jul. 21, 1998

[54] PROCESS AND APPARATUS FOR ADDRESS EXTENSION

[75] Inventors: John Michael Kaiser; Warren Edward Maule, both of Cedar Park, Tex.

[73] Assignee: International Business Machines Corporation, Armonk, N.Y.

[21] Appl. No.: 536,808

[22] Filed: Sep. 29, 1995

[51] Int. Cl.$^6$ .................................. G06F 12/00
[52] U.S. Cl. .................. 711/212; 711/2; 711/220; 711/211; 711/202
[58] Field of Search .................. 711/212, 220, 711/202, 2, 211

[56] References Cited

U.S. PATENT DOCUMENTS

| | | | |
|---|---|---|---|
| 4,037,211 | 7/1977 | Ikuta et al. | 711/212 |
| 5,103,418 | 4/1992 | Birger | 364/748 |
| 5,452,257 | 9/1995 | Han | 365/230.03 |
| 5,566,308 | 10/1996 | Bendelac et al. | 711/2 |
| 5,619,670 | 4/1997 | Shindo | 711/202 |

*Primary Examiner*—Eddie P. Chan
*Assistant Examiner*—Hong C. Kim
*Attorney, Agent, or Firm*—Kelly K. Kordzik; Winstead Sechrest & Minick P.C.; Anthony V. S. England

[57] ABSTRACT

Circuitry within a system memory controller of a data processing system enables an M-bit processor to address a memory location that requires an N-bit address, wherein N is greater than M. Thus, a less than 48-bit processor will be able to access IPL code resident within a 48-bit memory system. An M-bit address is received from a processor and then extended into an N-bit address with a mask of N–M bits. The extended address is compared with an N-bit address representing the memory location to be addressed, and the extended address is then selected to access the memory location when the extended address equals the N-bit address representing the memory location.

19 Claims, 2 Drawing Sheets

PROCESS AND APPARATUS FOR ADDRESS EXTENSION

TECHNICAL FIELD

The present disclosure relates in general to data processing systems, and in particular, to a system and method for enabling a processor to access a memory location within a memory system.

BACKGROUND INFORMATION

With the advent of the 64-bit processor, the number of address bits issued with any one command may vary in length depending on the design implementation. Typically, processors reserve a fixed address or a range of addresses in the upper portion of their address space for IPL (initial program load) code and system architected registers. With the supported number of address bits changing with each processor design, this address space will move with each processor design. In other words, a memory system configured as a 64-bit system will typically have the IPL code residing within the upper portion of the range of addresses for the 64-bit system. A processor configured for any number of address bits less than 64-bits will be unable to address the IPL within this 64-bit memory system.

Furthermore, it may be desirable to couple an M-bit processor to an N-bit memory system (wherein N is greater than M). For example, it may be desirable to produce a computer system having a memory and bus system capable of handling different sized processors simultaneously or as a result of an upgrade of the computer system.

Thus, what is needed in the art is a memory system that allows processors of different addressing capabilities to access needed data within those addresses in the memory system that would be otherwise unaddressable by the processor.

SUMMARY OF THE INVENTION

The present invention satisfies the foregoing need by providing for a data processing system having a memory system configured for N-bit address lengths and operable for coupling to a processor configured for M-bit address lengths by including circuitry that enables the processor to address a memory location within the memory system that is addressable with an X-bit address, wherein X is a range of addresses greater than M and less than or equal to N, and wherein X, M and N are integers greater than 0. In one embodiment of the present invention, the X-bit address corresponds to IPL code stored within the memory system, as well as system control functions, e.g., interrupt controllers, etc.

The data processing system utilizes an N-bit bus for coupling the processor with the memory system.

The present invention may utilize circuitry for receiving an M-bit address from the processor, circuitry for concatenating X–M bits to the received address, circuitry for performing a logical OR operation between the X–M bits of the address from the processor with an address mask of X–M bits, circuitry for concatenating the results of the logical OR operation with the remaining M-bits of the address received from the processor, circuitry for comparing the results of this concatenating operation with an X-bit address, circuitry for selecting the results of the logical OR operation in response to a result of the compare operation, and circuitry for outputting this selection as the address for accessing an address within the memory system.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
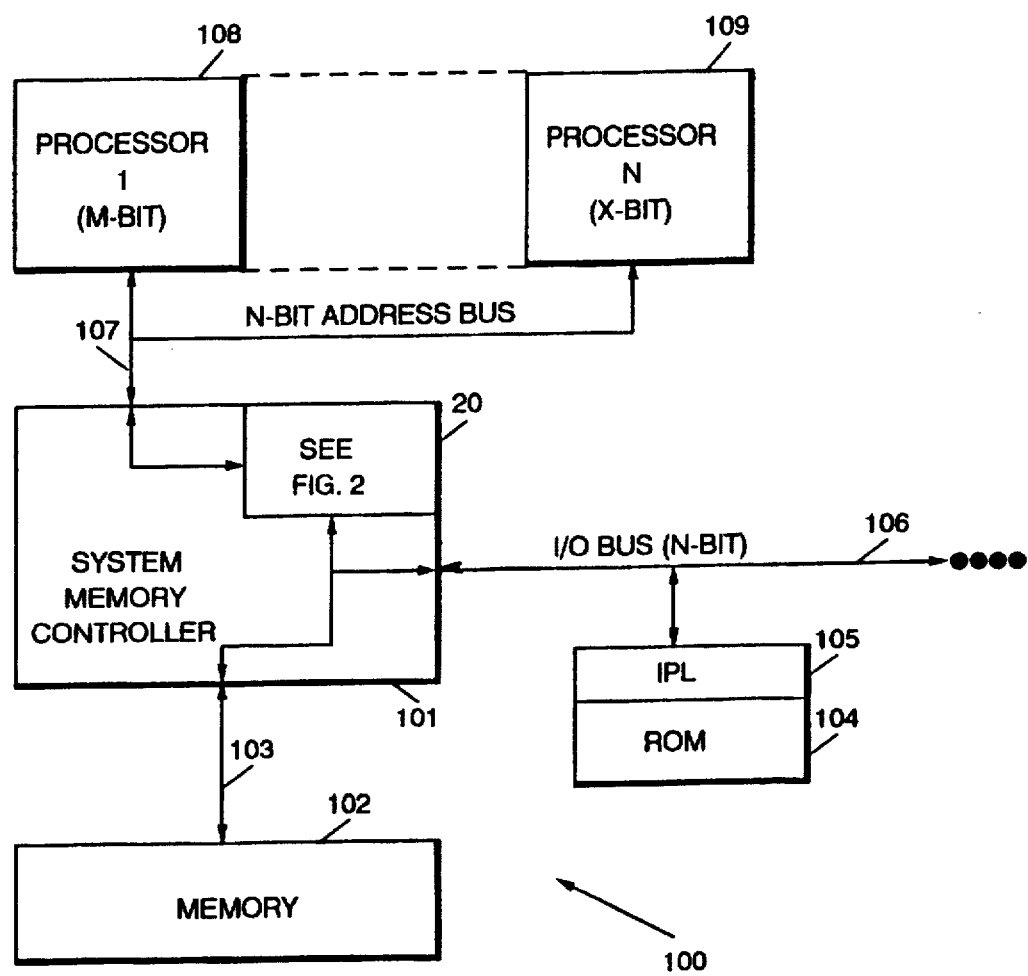
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Much of the following description pertains to the addressing of IPL (initial program load) code stored within a memory system. However, the present invention is capable of addressing any code stored within the memory system or device or system facility located at any address location. The IPL code referenced within this description is described as residing at a top-most address within the memory space of the memory system. However, the present invention is capable of functioning to address locations other than a top-most address within the memory space of the memory system.

Within a data processing system, after processor(s) have been initialized to their reset state, generally the first request issued externally to the memory system will be a read request to a predetermined address that is located in the IPL address space. This request will be processed by the IPL hardware in the system and instructions will be sent back to the processor. The code being run is dedicated code that is used to initialize the system to a state where the operating system can take over to run applications. The address of this first request will be to some fixed range of address space in the system memory map that the system architecture has defined as IPL space. This range of addresses will usually be in the upper portion of the architected address space of the processor.

As the number of implemented address bits in processors increase, this address range may move up in the memory map. To accommodate the different address lengths, the present invention effectively relocates the address so that the IPL device can assume that all processors have implemented a maximum number of address bits.

Referring to FIG. 1, there is illustrated data processing system 100 comprising a memory system, which includes address bus 107 and system memory controller 101 coupled to memory 102 by bus 103 and coupled to read only memory (ROM) 104 by I/O (input/output) bus 106. Address bus 107 is operable for coupling one or more processors to system memory controller 101. Shown are processors 108 and 109.

For the discussions below, address bus 107, system memory controller 101, memory 102 and ROM 104 along with buses 103 and 106 are configured to be able to handle a maximum address length of N bits. Processor 108 may be an M-bit processor capable of addressing M-bit addresses. As an example, the memory system may be configured as a 48-bit (N=48) system while processor 108 is configured as a 32-bit (M=32) system. (N, M and X are positive integers.) Processor 109 may be an X-bit processor, such as the above-noted 64-bit processors, variable to issue addresses between N and M bits.

The target memory location that processor 108 desires to access requires more than M bits to access. For example, the target location may require X bits to access. As an example, the target memory location may be memory location 105 containing IPL code and only addressable with an N-bit address.

For a portion of the following discussion, N shall be equal to 48 and M shall be equal to 32. Furthermore, the target location 105 will be the location containing the IPL code residing at the upper portion of the architected address space of the memory system. Using hexadecimal notation, this address space is at FFFFFFFFFFFF.

As can be readily seen, a 32-bit processor will be unable to address location 105, since 48 bits are required to address this memory space. The best that processor 108 can do is FFFFFFFF.

Figure 2:
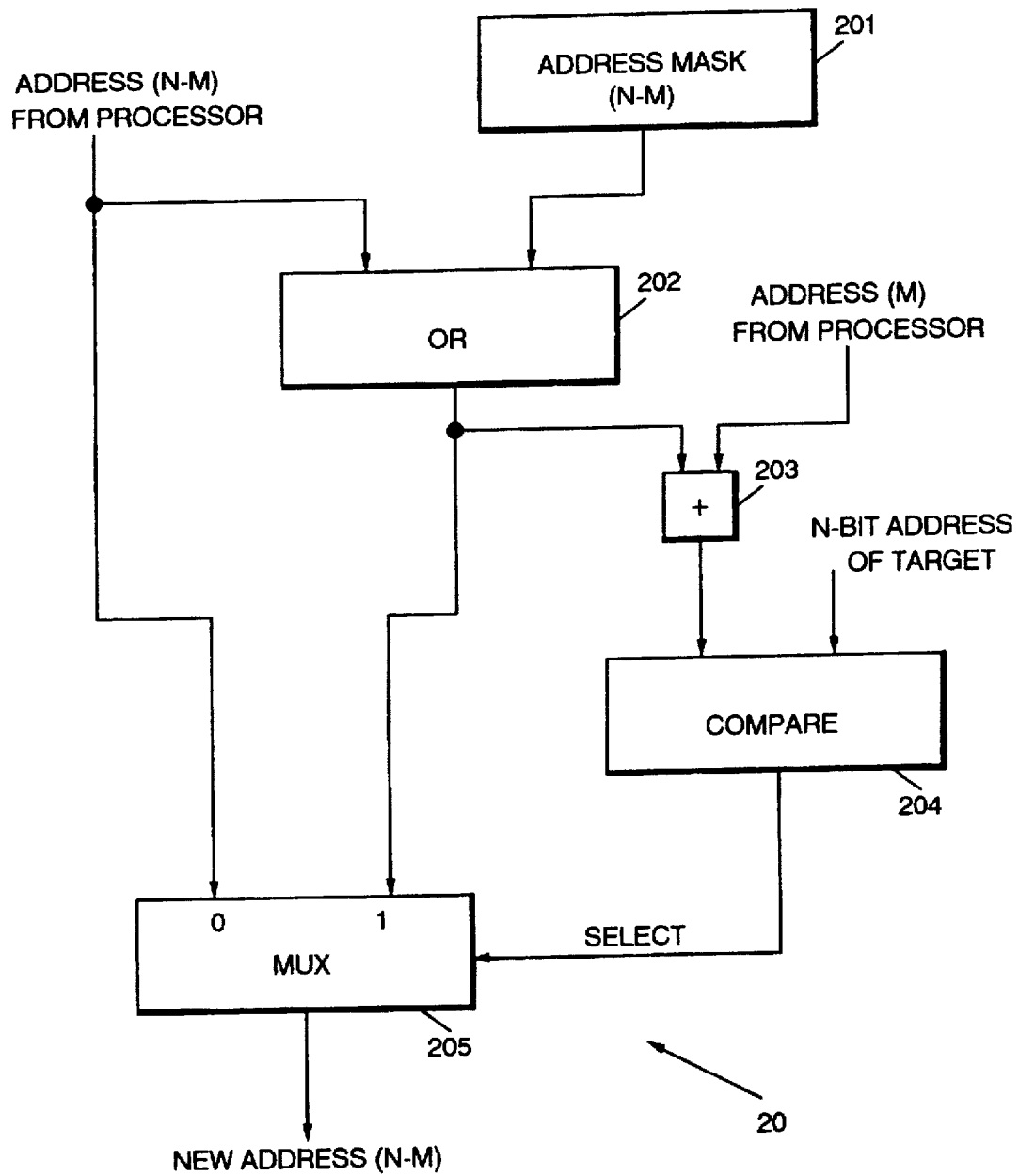
FIG. 2 illustrates a block diagram in accordance with the present invention.

Referring next to FIG. 2, there is illustrated circuitry 20, which is shown in FIG. 1 to be included within system memory controller 101. Note, circuitry 20 could be located in some other location within the memory system of data processing system 100. Circuitry 20 is configured for a minimum of M bits and a maximum of N bits. The address for location 105 is the N bit address provided to one of the inputs to compare circuit 204.

The process begins with processor 108 transmitting a 32-bit address for the IPL code. This 32-bit address is received by circuitry 20. Since the IPL code is only addressable with a 48-bit address, N−M 0 bits are concatenated to this 32-bit address. This may be performed simply by the fact that N−M bus lines on the N-bit address bus 107 are not driven by processor 108 resulting in these bit locations having 0 values.

Note, if processor 109, being an X-bit processor, is a 40-bit processor, then the address transmitted onto bus 107 by processor 109 will be a 40-bit address and only the upper 8 bus lines of bus 107 will not be asserted. Nevertheless, the upper N−M bits of the address from bus 107 will be provided to logical OR device 202 and to the 0 input of multiplexor circuit 205. As described above, if processor 108 has transmitted the address, then these N−M bits will be all 0 bits. If processor 109 has transmitted the address onto bus 107, then the uppermost 8 bits will be unasserted while the X−M bits will be asserted.

Address mask 201 is a mask field that is utilized to extend the received address to the full address length required to access the IPL code within memory location 105. To support processors that have less than 48 address bits implemented, address mask 201 will replace the un-implemented address bits with 1-bits for any address that falls into the IPL address space. Thus, address mask 201 provides N−M 1 bits to be masked with the N−M bits of the address received from bus 107.

Note, should the target address be different than the uppermost address within the memory space, then address mask 201 may be programmed to correspond to a different address within the memory space.

Logical OR device 202 will OR the received address with the address mask, and will output results to the I input of multiplexor circuit 205 and to one of the inputs of concatenating circuit 203 to produce an N-bit address to be compared to the N-bit address of the target address range, which in this case is memory location 105. These two addresses are compared by compare circuit 204. If there is a hit, then the SELECT line coupled to multiplexor circuit 205 will select the 1 input, which receives the resulting output of OR circuit 202. If there is not a hit, then the N−M upper bits of the address from the processor provided to the 0 input into multiplexor circuit 205 will be outputted as the N−M upper bits of a new address.

As a result, circuitry 20 operates to output the marked address from OR circuit 202 if the whole address matches a target address range. If there is not a hit, circuitry outputs the originally received address to the memory system.

If the new address output from circuit 205 falls within the target range, the address may be forwarded to I/O bus 106 instead of memory 103.

If the address received from either processor 108 or processor 109 is an address intended to access the IPL code, but the processor sourcing the address is not capable of addressing the IPL code, then circuitry 20 will effectively translate the received address from the processor into an address capable of accessing this IPL code. This translation is valid only if the target memory range is being accessed by the processor.

Although the present invention and its advantages have been described in detail, it should be understood that various changes, substitutions and alterations can be made herein without departing from the spirit and scope of the invention as defined by the appended claims.

What is claimed is:

1. A system comprising:

a memory system configured for N-bit address lengths;

bus means operable for coupling a processor to said memory system, wherein said processor is configured for M-bit address lengths, wherein M is less than N; and control means operable for enabling said processor to address a memory location in said memory system that is addressable with an X-bit address, wherein X is greater than M and less than or equal to N, wherein said control means further comprises:

circuitry for receiving an M-bit address from said processor;

circuitry for extending said M-bit address into a first X-bit address with a mask of X−M bits;

circuitry for comparing said extended address with a second X-bit address representing said memory location; and circuitry for selecting, from said extended address and another address, said extended address to access said memory location with said extended address when said extended address equals said second X-bit address representing said memory location, wherein said another address is selected when said extended address does not equal said second X-bit address.

2. The system as recited in claim 1, wherein said second X-bit address is for IPL code stored in said memory system.

3. The system as recited in claim 1, wherein said bus means is an N-bit bus.

4. The system as recited in claim 1, wherein N equals 48 and M equals 32.

5. The system as recited in claim 1, wherein N equals 64 and M equals 32.

6. The system as recited in claim 1, wherein said control means is contained within a memory controller external from the processor, wherein said control means further comprises:

means for receiving an M-bit address from said processor, wherein said M-bit address is an address that would refer to a memory location in an M-bit memory system containing data desired by said processor if said processor were coupled to such M-bit memory system; and means for translating said M-bit address received from said processor into a corresponding X-bit address, wherein said corresponding X-bit address contains, within said memory system configured for N-bit address lengths, said data desired by said processor.

7. The system as recited in claim 1, wherein said processor is only able to output addresses having M-bit address lengths.

8. A method for enabling a processor to address a memory location in a memory system that is addressable with an N-bit address, wherein said processor is configured for M-bit address lengths, and wherein N is greater than M, said method comprising the steps of:

receiving an M-bit address from said processor;

extending said M-bit address into a first N-bit address with a mask of N–M bits;

comparing said extended address with a second N-bit address representing said memory location; and selecting, from said extended address and another address, said extended address to access said memory location when said extended address equals said second N-bit address representing said memory location, wherein said another address is selected when said extended address does not equal said second N-bit address.

9. The method as recited in claim 8, wherein said second N-bit address is for IPL code stored in said memory system.

10. The method as recited in claim 9, wherein N equals 48 and M equals 40.

11. The method as recited in claim 8, wherein said another address is said M-bit address with N–M zero bits concatenated as most significant bits to said M-bit address.

12. An apparatus operable for enabling a processor to address a memory location in a memory system that is addressable with an N-bit address, wherein said processor is configured for M-bit address lengths, and wherein N is greater than M, said apparatus comprising:

circuitry operable for receiving an M-bit address from said processor;

circuitry operable for extending said M-bit address into a first N-bit address with a mask of N–M bits;

circuitry operable for comparing said extended address with a second N-bit address representing said memory location; and circuitry operable for selecting, from said extended address and another address, said extended address to access said memory location when said extended address equals said second N-bit address representing said memory location, wherein said another address is selected when said extended address does not equal said second N-bit address.

13. The apparatus as recited in claim 12, wherein said second N-bit address is for a system facility in said memory system.

14. The apparatus as recited in claim 13, wherein N equals 48 and M equals 36.

15. The apparatus as recited in claim 12, wherein said another address is said M-bit address with N–M zero bits concatenated as most significant bits to said M-bit address.

16. The apparatus as recited in claim 12, wherein N equals 64 and M equals 32.

17. The apparatus as recited in claim 12, wherein said circuitry operable for extending said M-bit address into said second N-bit address with said mask of N–M bits further comprises:

circuitry operable for concatenating N–M zero bits as most significant bits to said M-bit address; and an OR circuit operable for receiving said N–M zero bits and said mask of N–M bits, wherein said N–M bits are one bits.

18. The apparatus as recited in claim 17, wherein said circuitry operable for comparing said extended address with said second N-bit address representing said memory location further comprises:

circuitry for receiving a first result of said OR circuit;

circuitry for concatenating said first result with said M-bit address to produce a second result; and a comparator for comparing said second result to said second N-bit address representing said memory location.

19. The apparatus as recited in claim 18, wherein said circuitry operable for selecting said extended address to access said memory location when said extended address equals said second N-bit address representing said memory location further comprises a multiplexor coupled to said comparator and to said OR circuit.

* * * * *